(12) United States Patent
Doyle

(10) Patent No.: US 7,503,738 B1
(45) Date of Patent: Mar. 17, 2009

(54) DUNNAGE HOLDER

(76) Inventor: Gregory T. Doyle, 800 Lexington St., Norman, OK (US) 73069

( * ) Notice: Subject to any disclaimer, the term of this patent is extended or adjusted under 35 U.S.C. 154(b) by 0 days.

(21) Appl. No.: 12/061,953

(22) Filed: Apr. 3, 2008

(51) Int. Cl.
*B60P 7/08* (2006.01)

(52) U.S. Cl. ................ 410/152; 410/121; 410/143; 410/155

(58) Field of Classification Search ............ 410/30, 410/50, 121, 140, 143, 152, 155, 89; 224/403, 224/322, 42.33; 248/351
See application file for complete search history.

(56) References Cited

U.S. PATENT DOCUMENTS 4,315,707 A * 2/1982 Fernbach ............... 410/47

* cited by examiner

*Primary Examiner*—Stephen Gordon

(57) ABSTRACT

A dunnage holder constructed by a vertically oriented steel tube that has a generally hollow rectangular cross-section adapted for inserting into a stake hole around an outer rail of a flatbed trailer, the steel tube that has a length of at least 3-inches; and a U-shaped steel channel permanently attached by straddling in an inverted position to a top of the steel tube, the U-shaped steel channel that has an opening sufficiently large to receive a first end of a 4-inch by 4-inch wooden brace therein and to dispose the wooden brace across a full width of a flatbed of the trailer when a second end of the wooden brace is received by a corresponding, oppositely positioned U-shaped steel channel on an opposite end of the flatbed.

4 Claims, 3 Drawing Sheets

DUNNAGE HOLDER

FIELD OF THE INVENTION

The present invention generally relates to a truck accessory and more particularly, relates to a dunnage holder for a commercial flatbed trailer.

BACKGROUND OF THE INVENTION

Commercial flatbed trailers are frequently used in freight shipping and delivery. The flatbed trailer enables easier loading and unloading onto the flatbed from a high-low lifter vehicle or a fork truck. However, it is desirable that, on the flatbed of the trailer, there are means for restricting the movement of the loaded goods or machine such that they do not move when the vehicle is in motion. It is therefore desirable to provide a strong steel dunnage holder for use on a commercial flatbed trailer to hold securely goods or machines that are loaded onto the flatbed trailer.

It is therefore an object of the present invention to provide a dunnage holder capable of anchoring a 4-inch square wooden brace into position across a flatbed trailer when loading and unloading.

It is another object of the present invention to provide a dunnage holder capable of anchoring 4-inch square wooden brace into position to prevent sliding or movement of the wooden brace during vehicle movement.

SUMMARY OF THE INVENTION

In accordance with the present invention, a dunnage holder for securely anchoring a 4-inch square wooden brace on the flatbed of a trailer is provided.

In a preferred embodiment, the present invention dunnage holder can be constructed of a vertically oriented steel tube that has a generally hollow rectangular cross-section adapted for inserting into a stake hole around an outer rail of a flatbed trailer, the steel tube that has a length of at least 3-inches; and a U-shaped steel channel permanently attached by straddling in an inverted position to a top of the steel tube, the U-shaped steel channel that has an opening sufficiently large to receive a first end of a 4-inch by 4-inch wooden brace therein and to dispose the wooden brace across a full width of a flatbed of the trailer when a second end of the wooden brace is received by a corresponding, oppositely positioned U-shaped steel channel on an opposite end of the flatbed.

BRIEF DESCRIPTION OF THE DRAWINGS

The present invention will now be described, by way of example, with reference to the accompanying drawings, in which:

FIG. 2 is a perspective view of a pair of dunnage holders for holding a wooden brace therein between.

DETAILED DESCRIPTION OF THE PREFERRED EMBODIMENT

The present invention dunnage holder is used for securely anchoring a 4-inch square wooden brace on a flatbed trailer for securing loading and unloading of goods and machineries.

The present invention dunnage holder is a strong steel dunnage holder for a commercial flatbed trailer. The dunnage holder solidly anchors a 4-inch square wooden brace into position across the bed when loading and unloading. The dunnage holder prevents sliding or movement of the wooden piece, providing added safety and convenience for truck drivers. The holder keeps the wooden dunnage secure while traveling down the highway. The dunnage holder is constructed primarily of an upright steel tube welded to a section of channel steel. The rectangular tubing measures approximately 3 inches by 1½ inch. The bottom end can be inserted into one of the stake holes already installed around the outer rails of the flatbed trailer. Welded to the top of the upright square steel tube is a section of steel channel. This can be fabricated from a 3 by 3/16-inch steel plate shaped like an inverted U with straight sides. The inverted channel fits precisely over the outer end of the 4 by 4-inch wooden dunnage extended across the flatbed trailer. One holder can be used at both edges of the flatbed trailer to securely hold the wooden piece from the opposite ends. The dunnage holder prevents the shifting or sliding as the trailer was loaded or unloaded. When traveling on the open highway, the present invention keeps the wooden beam from moving. This can be used by trucking companies and truck drivers and can be offered as standard equipment with new production flatbed trailers.

The present invention dunnage holder fulfills the need for securing wooden dunnage on a flatbed trailer. The appealing features of the present invention are strength, safety, and convenience. The present invention prevents the solid wood member from shifting or sliding upon loading or unloading the trailer. The strong steel brace anchors it into position. This simplifies the operation and provides added convenience. On the highway, the dunnage holder immobilizes the wood to prevent it from bouncing or shifting and posing a serious potential safety hazard. This provides peace of mind for safety-conscious truck drivers by reducing stress and anxiety. The dunnage holder can also be reliable, simple to use, and cost-effective.

Figure 1:
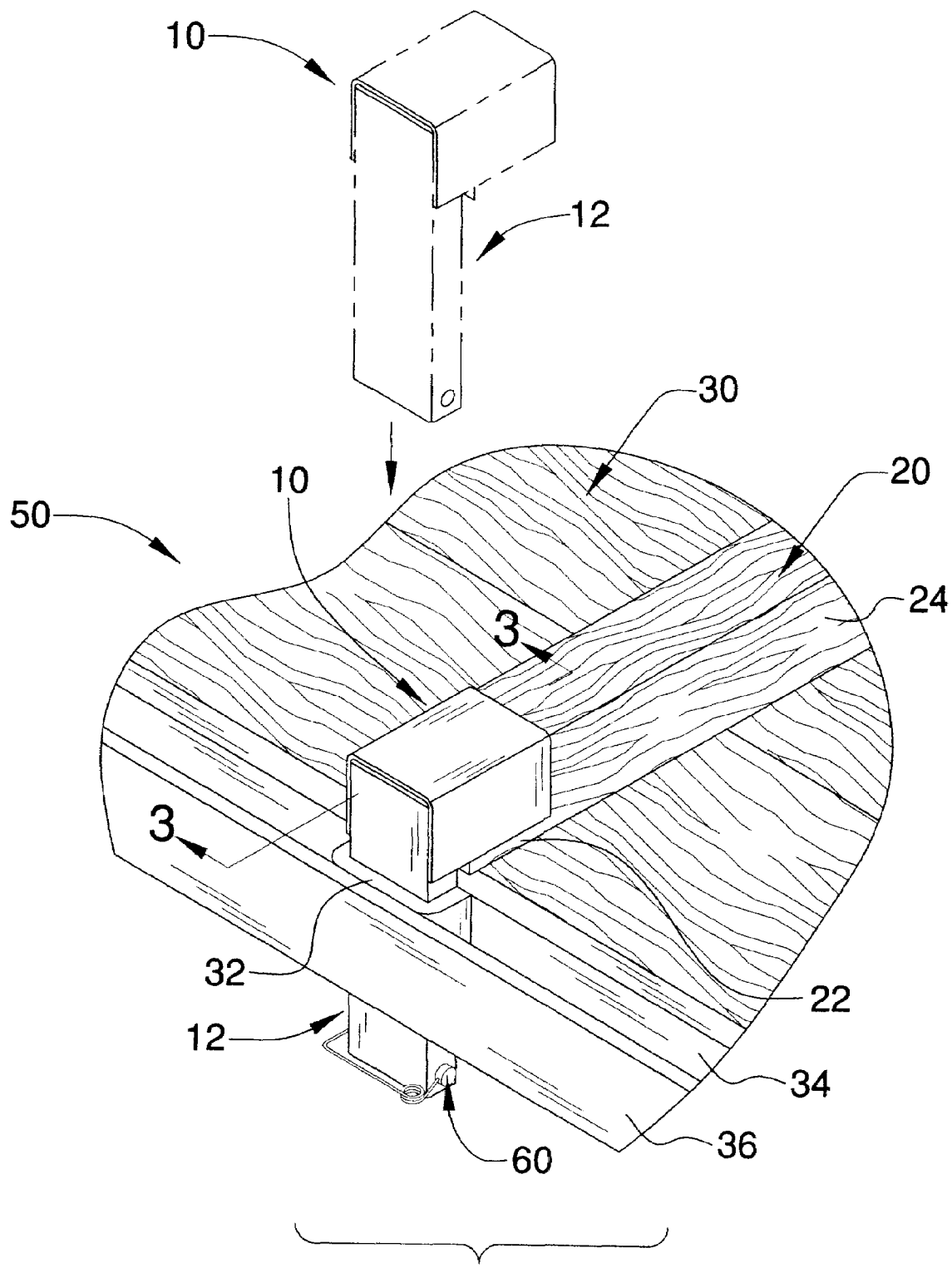
FIG. 1 is a perspective view of the present invention dunnage holder in use.

Referring initially to FIG. 1, wherein a perspective view of a present invention dunnage holder 10 is shown holding a 4-inch square wooden brace 20 on a flatbed 30 of a trailer. The dunnage holder 10 is constructed of a vertically oriented steel tube 12 which has a generally hollow, rectangular cross-section adapted for inserting into a stake hole 32 positioned around an outer rail 34 of the flatbed 30. The steel tube 12 has a length of at least about 3 inches.

The present invention dunnage holder 10 further include a U-shaped steel channel 40 that is permanently attached, such as by welding, by straddling in an inverted position to a top 14 of the steel tube 12. The U-shaped steel channel 40 has an opening 42 that is sufficiently large to receive a first end 22 of a 4-inch by 4-inch wooden brace 20 therein and to dispose the wooden brace 20 across a full width of the flatbed 30 of the trailer 50 when a second end 24 of the wooden brace 20 is received by a corresponding oppositely positioned U-shaped steel channel 40A on an opposite end of the flatbed 30.

Figure 2:
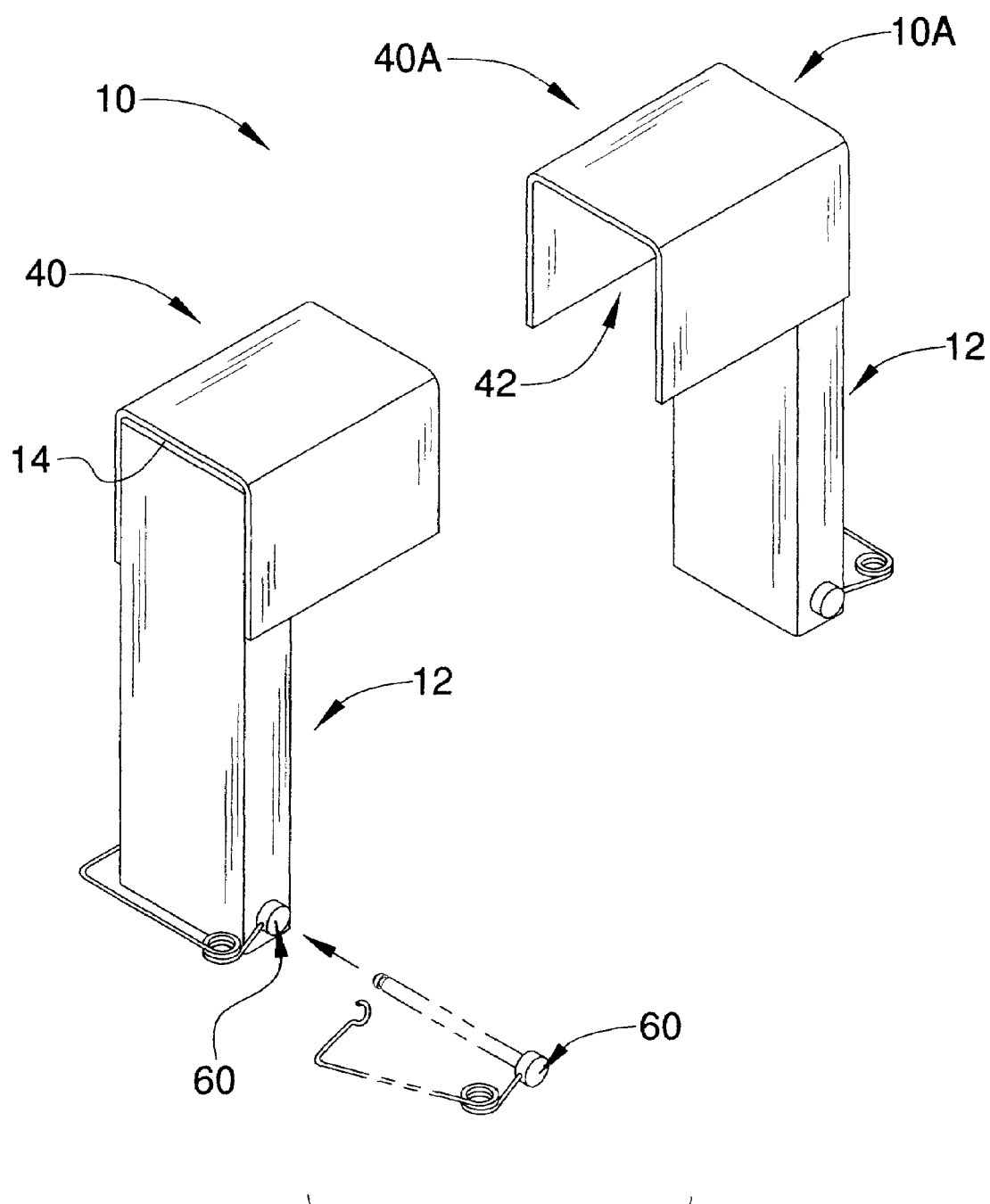
Figure 3:
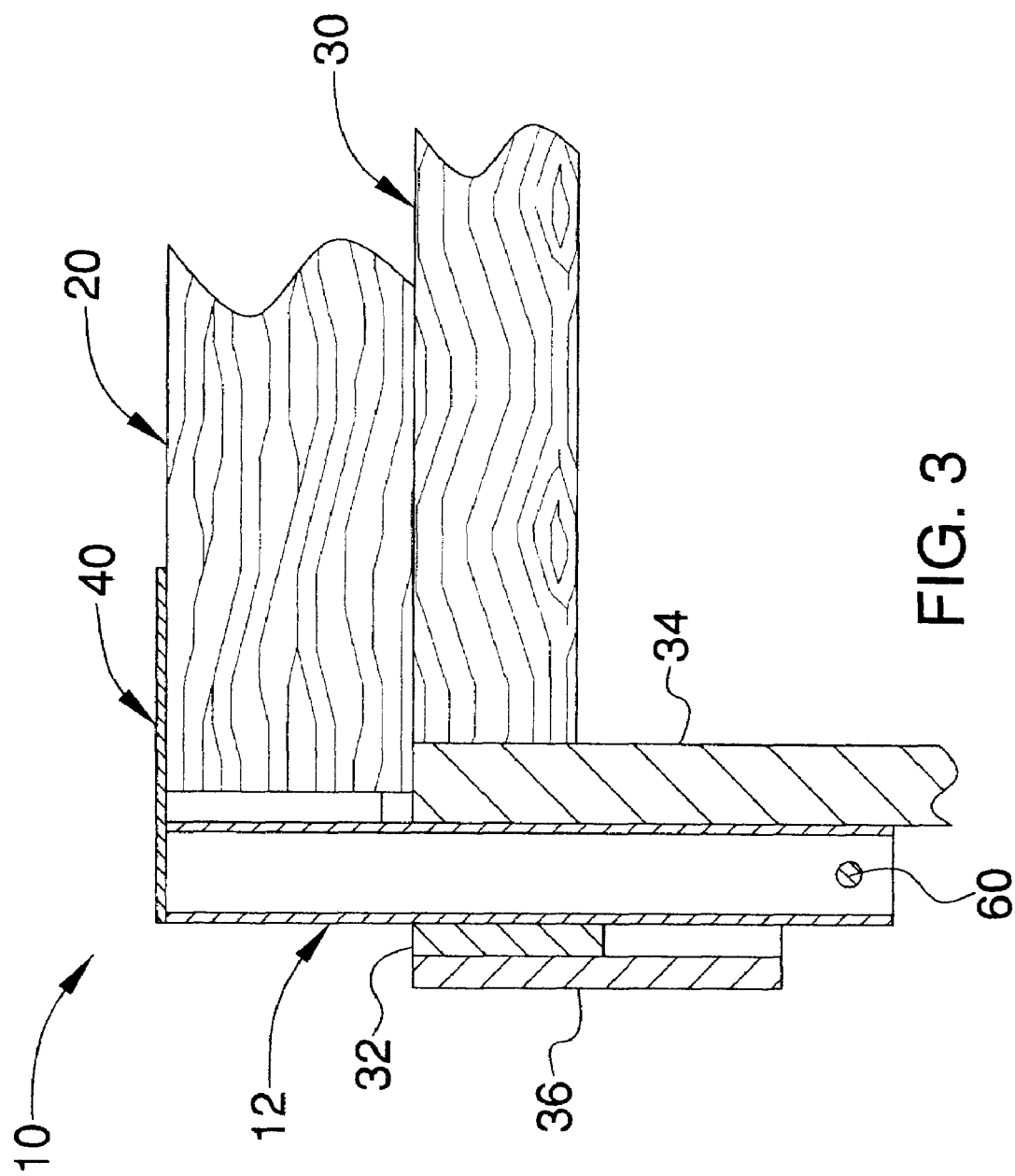
FIG. 3 is a cross-sectional view of the present invention dunnage holder holding a 4-inch square wood brace on a flatbed trailer.

A pair of the present invention dunnage holder 10, 10A are shown in FIG. 2, while a partial, cross-sectional view is shown in FIG. 3.

As shown in FIGS. 2 and 3, an optional locking pin 60 that penetrates through a narrow side of the steel tube 12 and the stake hole (not shown). It should be noted that the locking pin 60 can also be used to penetrate the steel tube 12 only, without going through the stake hole 32. FIGS. 1 and 3 further show a trailer side rail 36 adjacent to the stake hole 32.

The present invention dunnage holder has therefore been amply described in the above descriptions and in the appended drawings of FIGS. 1-3.

While the preferred embodiments of the invention have been described above, it will be recognized and understood that various modifications can be made in the invention and the appended claims are intended to cover all such modifications which may fall within the spirit and scope of the invention.

What is claimed is:

1. A dunnage holder comprising:
 a vertically oriented steel tube having a generally hollow rectangular cross-section adapted for inserting into a stake hole around an outer rail of a flatbed trailer, said steel tube having a length of at least 3-inches; and
 a first U-shaped steel channel permanently attached by straddling in an inverted position to a top of said steel tube, said U-shaped steel channel having an opening sufficiently large to receive a first end of a 4-inch by 4-inch wooden brace therein and to dispose said wooden brace across a full width of a flatbed of said trailer when a second end of said wooden brace is received by a corresponding, oppositely positioned U-shaped steel channel on an opposite end of said flatbed.

2. The dunnage holder according to claim 1 further comprising a locking pin penetrating through a narrow side of said steel tube.

3. The dunnage holder according to claim 1 further comprising a locking pin penetrating through a narrow side of said steel tube and said stake hole.

4. The dunnage holder according to claim 1, wherein said first U-shaped steel channel is welded to said top of the steel tube.

* * * * *